US011409593B1

(12) United States Patent
Kumar et al.

(10) Patent No.: US 11,409,593 B1
(45) Date of Patent: Aug. 9, 2022

(54) DISCOVERING INSIGHTS AND/OR RESOLUTIONS FROM COLLABORATIVE CONVERSATIONS

(71) Applicant: International Business Machines Corporation, Armonk, NY (US)

(72) Inventors: Harshit Kumar, Delhi (IN); Raghav Batta, San Jose, CA (US); Jinho Hwang, Dobbs Ferry, NY (US); Larisa Shwartz, Greenwich, CT (US); Gargi B. Dasgupta, Bangalore (IN); Prateeti Mohapatra, Bangalore (IN); Amar Prakash Azad, Bangalore (IN); Nikhil Verma, Silvassa (IN); Ajay Gupta, Bengaluru (IN); Pooja Aggarwal, Bengaluru (IN); Jakub Krchák, Jindrichuv Hradec (CZ)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/394,667

(22) Filed: Aug. 5, 2021

(51) Int. Cl.
*G06F 11/07* (2006.01)
(52) U.S. Cl.
CPC ........ *G06F 11/079* (2013.01); *G06F 11/0709* (2013.01)
(58) Field of Classification Search
CPC .............. G06F 11/0709; G06F 11/079; G06F 11/0793
See application file for complete search history.

(56) References Cited

U.S. PATENT DOCUMENTS

| 7,487,095 | B2 | 2/2009 | Hill |
| 8,000,973 | B2 | 8/2011 | Williams |
| 9,229,800 | B2 * | 1/2016 | Jain ........................ H04L 43/045 |
| 2011/0126128 | A1 | 5/2011 | Mckenzie |
| 2014/0096249 | A1 | 4/2014 | Dupont |
| 2014/0129536 | A1 | 5/2014 | Anand |

(Continued)

OTHER PUBLICATIONS

Authors et al.: Disclosed Anonymously, "Method or System to positively influence NPS and reduce Time to Resolution by optimize communications", An IP.com Prior Art Database Technical Disclosure, IP.com No. IPCOM000263305D, IP.com Electronic Publication Date: Aug. 17, 2020, 6 pages.

*Primary Examiner* — Joseph R Kudirka
(74) *Attorney, Agent, or Firm* — Stephen R. Yoder (57) ABSTRACT

Methods, computer program products, and/or systems are provided that perform the following operations: in an information technology (IT) management system, grouping one or more ongoing service failure events into a service failure record; identifying a representative event for the service failure record; identifying one or more conversations that relate to the one or more ongoing service events; computing, using a similarity algorithm, feature similarity scores for respective conversations of the one or more conversations based, at least in part, on the features associated with the representative event and features associated with the respective conversations; linking a subset of the one or more conversations to the one or more ongoing service events in the service failure record based, at least in part, on the computed feature similarity scores; and providing the service failure record to a collaboration platform utilized in addressing the one or more ongoing service events.

20 Claims, 6 Drawing Sheets

(56) References Cited

U.S. PATENT DOCUMENTS

| | | |
|---|---|---|
| 2015/0020002 A1 | 1/2015 | Mckenzie |
| 2015/0178371 A1 | 6/2015 | Seth |
| 2015/0317337 A1 | 11/2015 | Edgar |
| 2018/0039914 A1 | 2/2018 | Menahem |
| 2018/0150555 A1 | 5/2018 | Karuppasamy |
| 2019/0132191 A1* | 5/2019 | Mann .................... G06Q 30/01 |

* cited by examiner

DISCOVERING INSIGHTS AND/OR RESOLUTIONS FROM COLLABORATIVE CONVERSATIONS

BACKGROUND

The present invention relates generally to the field of information technology (IT) management, and more particularly to discovering insights from conversations and associating the insights to service events in an IT management system.

SUMMARY

According to an aspect of the present invention, there is a method, computer program product and/or system that performs the following operations (not necessarily in the following order): in an information technology (IT) management system, grouping one or more ongoing service failure events into a service failure record; identifying a representative event for the service failure record from the one or more ongoing service failure events grouped in the service failure record; extracting features associated with the representative event; identifying one or more conversations, stored in the IT management system, that relate to the one or more ongoing service events; computing, using a similarity algorithm, feature similarity scores for respective conversations of the one or more conversations based, at least in part, on the extracted features associated with the representative event and features associated with the respective conversations; linking a subset of the one or more conversations to the one or more ongoing service events in the service failure record based, at least in part, on the computed feature similarity scores; and providing the service failure record to a collaboration platform utilized in addressing the one or more ongoing service events.

DETAILED DESCRIPTION

According to aspects of the present disclosure, systems and methods can be provided to assist in discovering insights, resolutions, and/or the like for service failures based on collaborative conversations. In particular, systems and methods of the present disclosure can provide for grouping events (e.g., alerts, anomalies, etc.) and creating a service story including the grouped events. The systems and methods of the present disclosure can provide for identifying a representative event for the group of events and extracting features for the representative event. In some embodiments, the systems and methods of the present disclosure can provide for identifying recent change tickets related to the event(s). In some embodiments, the systems and methods of the present disclosure can provide for obtaining log templates for the event(s), for example, based on application logs. The systems and methods of the present disclosure can provide for tracking new conversations occurring in response to the event(s). The systems and methods of the present disclosure can provide for identifying similar historical conversations. The systems and methods of the present disclosure can provide for linking events and conversations for a service story. The systems and methods of the present disclosure can provide for using the story to discover insights, resolutions, and/or the like to assist in addressing service events/issues, for example, based on overlapping information between events and conversations in the story.

In general, when services fail, leading to alerts, anomalies, and/or the like, a user such as a site reliability engineer (SRE) becomes involved, where the user's role is to ensure that services run uninterrupted (e.g., if services fail, the services are returned to normal execution as quickly as possible while minimizing impacts to any client business. While resolving an issue, one approach often used was to create a centrally designated "War Room" where all stakeholders were physically present.

Generally, collaborative tools in an information technology (IT) operation management system may act as a virtual war room that can allow teams to collaborate/communicate with each other, with a common aim to identify the problem, the symptoms, and the next best action among the list of possible actions that can help resolve the issue. Often, such conversations, which may be included in multiple channels when there are multiple teams handling issues at different levels (e.g., application, network, storage, etc.), can contain rich information that may assist in further diagnosis and, in turn, resolution of critical issues.

Accordingly, systems and methods of the present disclosure can provide for associating conversations (e.g., collaborative conversations, etc.), for example, occurring in the virtual war room(s), around the service events (e.g., alerts, anomalies, metrics, etc.) to discover and/or provide enriched insights that can provide key indicators to help quickly identify the main issue(s) and reduce the mean time to resolve and/or recover from the issue. For example, according to some embodiments of the present disclosure, as the handling of events/issues progresses and more and more information is getting added to an overall story, key information from top similar conversations can be retrieved and used in making recommendations to assist in addressing/resolving service events/issues. Further, in some embodiments, systems and methods of the present disclosure can provide root cause analysis to assist in making informed decisions.

Systems and methods of the present disclosure improve upon existing systems and methods in several meaningful ways. For example, while existing methods for dialog mining and intent understanding exist, such methods do not correlate mined dialog with IT events generated from sources of IT issues, thereby allowing for the selection and use of dialog that is most helpful in solving the IT issues. Further, while existing methods may use information from existing conversations to answer questions or queries, such methods do not augment that information via correlation to increase the amount of useful evidence for helping SREs resolve IT issues.

This Detailed Description section is divided into the following sub-sections: The Hardware and Software Environment; Example Embodiments; Further Comments and/or Embodiments; and Definitions.

The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
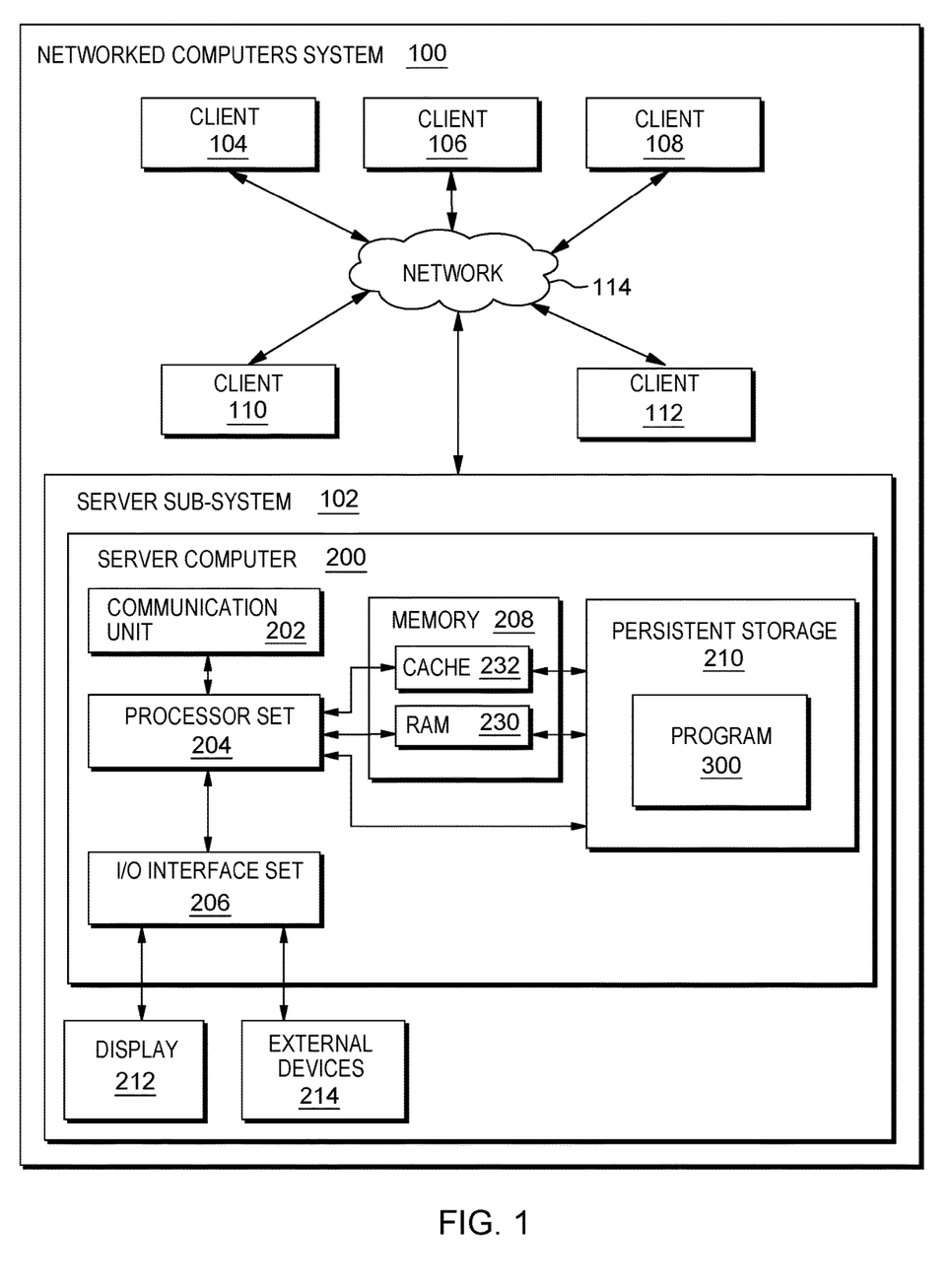
FIG. 1 depicts a block diagram view of a first embodiment of a system, according to the present invention.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine-readable instructions and/or data that can be used to create, manage, and control certain software functions, such as will be discussed in detail, below, in the Example Embodiment sub-section of this Detailed Description section. As an example, a program 300 can identify and group service failure events (e.g., alerts, anomalies, etc.); identify related change tickets; identify related log templates; identify collaborative conversations related to the service events; generate service failure stories based on events, conversations, etc.; generate insights based on the service failure stories to assist in resolution, root cause analysis, etc.; obtain feedback to improve event-conversation linkage; and/or the like.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). For example, program 300 may include machine readable and performable instructions to provide for performance of method operations as disclosed herein. In this particular embodiment, persistent storage 210 includes a magnetic hard disk drive. To name some possible variations, persistent storage 210 may include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor, a smart phone/tablet display screen, and/or the like.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Example Embodiments

Figure 2:
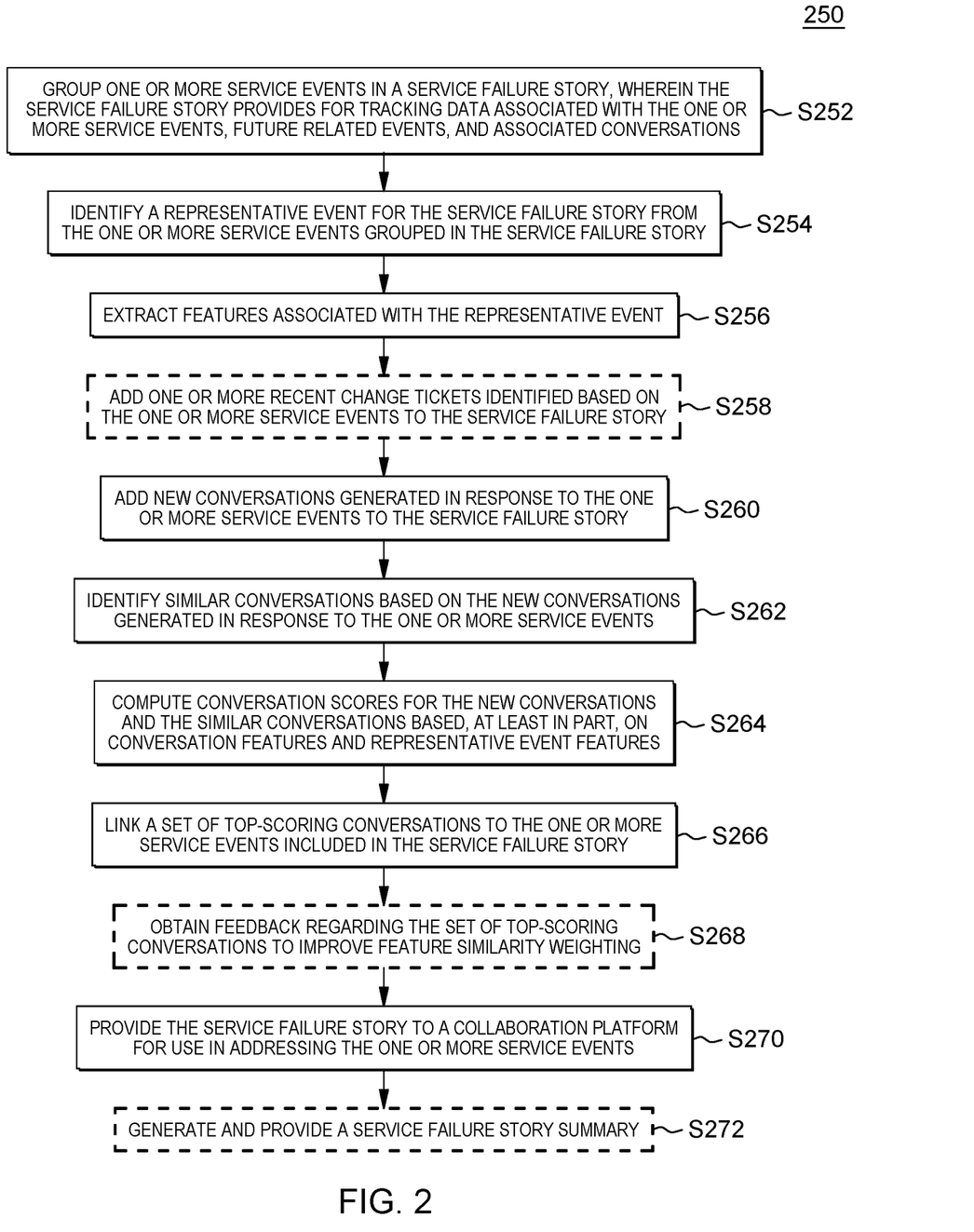
FIG. 2 depicts a flowchart showing a first embodiment method performed, at least in part, by the first embodiment system.
Figure 3:
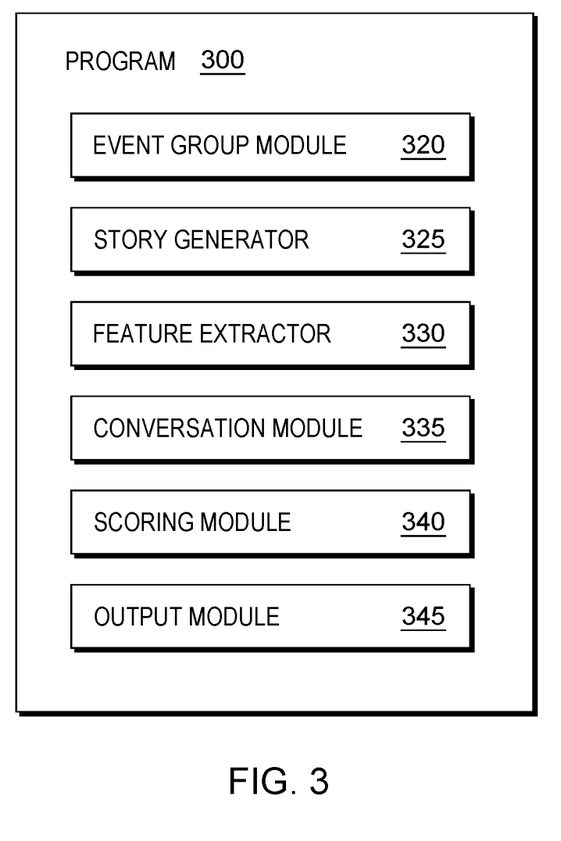
FIG. 3 depicts a block diagram showing an example machine logic (for example, software) portion of the first embodiment system.

FIG. 2 shows flowchart 250 depicting a computer-implemented method, according to embodiment(s) of the present invention. FIG. 3 shows a program 300 for performing at least some of the method operations of flowchart 250. Regarding FIG. 2, one or more flowchart blocks may be identified with dashed lines and represent optional steps that may additionally be included, but which are not necessarily required, in the depicted embodiments. This method and associated software will now be discussed, over the course of the following paragraphs, with extensive reference to FIG. 2 (for the method operation blocks) and FIG. 3 (for the software blocks).

As illustrated in FIG. 2, in some embodiments, operations for discovering/generating insights based on events (e.g., service failure events, etc.) and collaborative conversations begin at operation S252, where a computing system (e.g., server computer 200 of FIG. 1 or the like) groups one or more service events (e.g., alerts, anomalies, etc.) in a service failure story (e.g., story).

A service failure story (e.g., story), also referred to as a service failure record, can provide for tracking (e.g., include, etc.) data associated with/representative of one or more service events, future related events, associated conversations (e.g., collaborative platform conversations, etc.), other associated data, and/or the like. In some embodiments, conversations (e.g., collaborative conversations, etc.) associated with a service event (e.g., triggering event, ongoing event, etc.) and/or included in a service failure story can include new conversations (e.g., associated with/resulting from a service event included in a story, etc.), identified similar conversations (e.g., similar historical conversations, etc.), and/or the like. In some embodiments, a service failure story can include data associated with identified related change tickets, extracted log data (e.g., log template, etc.), and/or the like.

As an example, an event group module 320 of FIG. 3 and/or the like can provide for identifying events (e.g., associated with a service failure, etc.) and grouping the events (e.g., alerts, anomalies, etc.) in a story (e.g., service failure story, etc.). The event group module 320, story generator 325, and/or the like can create a new story, for example, in response to a triggering event (service alert, anomaly, etc.) to track triggering event(s) and any future (e.g., following) related events. In some embodiments, for example, as new events occur/appear over time they can be included in (e.g., become part of) a relevant story. As an example, an event group module 320, story generator 325, and/or the like can provide for identifying the occurrence/appearance of new event(s) related to and/or associated with event(s) that triggered and/or that are included in a particular story and add the new event(s) to a relevant story. In some embodiments, a story (e.g., service failure story, etc.) can include one or more events such as alerts, anomalies, conversation, and/or the like. In some embodiments, insight discovery can come into action and create a story based on a triggering event and in some cases, for example, before an incident is created.

In some embodiments, events can be grouped based on one or more features (e.g., event features, etc.). In some embodiments, for example, features used for event grouping can include entities, time, relation identifiers, resource identifiers, log templates, and/or the like. As an example, an event group module 320 of FIG. 3 and/or the like can provide for grouping events (e.g., relevant to a story, etc.) based on entity data associated with the event(s), temporal proximity data associated with the event(s), relation identifier data associated with the event(s), resource identifier data associated with the event(s), log data (e.g., log templates, etc.) associated with the event(s), and/or the like. In some embodiments, log templates for an event (e.g., associated with/related to an event, etc.) may be obtained from log data (e.g., application logs, etc.). For example, in some embodiments, a query may be used to retrieve logs between a start time (e.g., "start-time") and some interval prior to the start time (e.g., "start-time minus 10", etc.) and log mining may be performed to convert the identified logs to log templates for the event(s).

Processing proceeds to operation S254, where the computing system (e.g., server computer 200 of FIG. 1 or the like) identifies a representative event for the service failure story (e.g., representative of the whole group of events) from the one or more service events grouped in the service failure story. As an example, an event group module 320, story generator 325, and/or the like can provide for identifying a representative event for a group of events. In some embodiments, a representative event may be identified based on comparisons of one or more features for each event in the group with features of all other events in the group. In some embodiments, similarities between events in a group (e.g., based on event features, etc.) may be represented as a priority queue (e.g., "sim, event_i, event_j") and a weighted sum of similarities may be calculated for each event in the group. The event having the highest score (e.g., based on weighted sum of similarities, etc.) can be selected as the representative event for the group of events.

Processing proceeds to operation S256, where the computing system (e.g., server computer 200 of FIG. 1 or the like) can extract features associated with the representative event. As an example, a feature extractor 330 of FIG. 3 and/or the like can extract one or more features associated with the representative event. In some embodiments, for example, extracted representative event features can include log templates, entities, a relation identifier, a resource identifier, related changes, and/or the like. In some embodiments, for example, one or more features extracted for the representative event may be used in identifying related/associated data for a story (e.g., service failure story, etc.), linking conversations (e.g., new conversations, similar conversations, etc.) with events in a story (e.g., service failure story, etc.), and/or the like.

Optionally, in some embodiments, processing may continue to operation S258, where the computing system (e.g., server computer 200 of FIG. 1 or the like) may identify (e.g., extract, etc.) one or more recent change tickets based, at least in part, on the occurrence of the one or more service events. The computing system may add the identified one or more recent change tickets (e.g., related changes data, etc.) to the story (e.g., service failure story, etc.). For example, the computing system may associate (e.g., add) one or more recent change tickets to the story by identifying related changes based on topological entities, temporal vicinity, and/or the like. In some embodiments, one or more recent change tickets may be identified and added to the story (e.g., as related changes, etc.) based on a likelihood that a recent change ticket (e.g., recent change(s), etc.) induced the event(s).

In some embodiments, for example, one or more recent change tickets may be extracted from a change tickets store (e.g., database, etc.) and any related changes identified may be added to the story (e.g., service failure story, etc.). As an example, in some embodiments, the computing system may extract image names from recent change tickets. The computing system may identify topology objects/components (e.g., containers, nodes, pods, deployment, deployment configuration, etc.) associated with the images touched by the change. The computing system may add any related changes to the story based on common topology objects (e.g., implemented on topology objects/components associated with one or more service events included in the story, etc.) and/or related topology objects/components.

In some embodiments, the computing system may sort the identified one or more recent change tickets based, for example, on a relevance to the occurrence of an event included in the story (e.g., service failure story, etc.). As an example, in some embodiments, a relevance for sorting related changes may be based, at least in part, on a relation of the change and the topology object/component (e.g., a change on a same container is more relevant than a change on a same node). In some embodiments, a relevance for sorting related changes may be based, at least in part, on whether a change was recently made on the same topology object/component (e.g., associated with an event) and/or a related topology object/component. In some embodiments, a relevance for sorting related changes may be based, at least in part, on a time difference between a change and an event (e.g., how recent the change was to the event, etc.).

Processing proceeds to operation S260, where the computing system (e.g., server computer 200 of FIG. 1 or the like) can add new conversations (e.g., conversations/discussions started on a collaboration platform, etc.) generated in response to the one or more service events to the service failure story. As an example, a conversation module 335 of FIG. 3 and/or the like can add new conversations (e.g., conversation data, etc.), for example, collaborative conversations/discussions started in channels based on the occurrence of and/or in response to the event(s), to the story (e.g., service failure story, etc.). In some embodiments, useful information (e.g., key information of interest, etc.) may be identified/extracted from each conversation. For example, useful information (e.g., key information of interest, etc.) may include issue description, entities, link(s) to log templates, change ticket(s) which induced an issue/event, resolution, and/or the like.

Processing proceeds to operation S262, where the computing system (e.g., server computer 200 of FIG. 1 or the like) can identify similar conversations (e.g., historical conversations, etc.) based on the new conversations generated in response to the one or more service events. As an example, a conversation module 335 and/or the like can identify similar conversations to the current/ongoing conversations from a store of historical conversation data and/or the like.

Processing proceeds to operation S264, where the computing system (e.g., server computer 200 of FIG. 1 or the like) can compute conversation scores (also referred to as feature similarity scores) for the new conversations and the similar conversations based, at least in part, on conversation features and representative event features. As an example, a scoring module 340 of FIG. 3 and/or the like can compute conversation scores for each new conversation and/or similar historical conversation based, at least in part, on one or more features. In some embodiments, for example, the computing system may score conversations based on determining the overlap of key features between conversations and events.

In some embodiments, the computing system may extract conversation features from each new conversation and/or similar historical conversation. In some embodiments, extracted conversation features may include, for example, impact, region, symptom, investigation, start time, action failed, resolution, change ticket(s) which induced event/issue, issue description, entities, and/or the like.

In some embodiments, for example, the computing system may compute a similarity between a conversation and an event based on a set of defined features (e.g., one or more features common to conversations and events, etc.). For example, in some embodiments, a similarity between a conversation and an event may be computed based on features including region, log templates, entities, change ticket(s), and/or the like. The computing system may compute weighted similarity scores for each conversation.

As an example, in some embodiments, a weight similarity score may be computed as:

$$\text{Score}=k1\cdot\text{region\_similarity\_score}+k2\cdot\text{log-template\_similarity\_score}+k3\cdot\text{entity\_similarity\_score}+k4\cdot\text{change\_similarity\_score},$$

where $k1+k2+k3+k4=1$ and the values of k1, k2, k3, and k4 may be finetuned based on feedback (e.g., user feedback, etc.).

The computing system may provide a set of top-scoring conversations (i.e., a subset of the entire set of conversations) based on the weighted similarity scores. For example, in some embodiments, the computing system may return the top k similar conversations.

Processing proceeds to operation S266, where the computing system (e.g., server computer 200 of FIG. 1 or the like) can link a set of top-scoring conversations to the one or more service events included in the service failure story. As an example, a conversation module 335 and/or the like can link the top scoring conversations to events in the story (e.g., service failure story, etc.).

Optionally, in some embodiments, processing may continue to operation S268, where the computing system (e.g., server computer 200 of FIG. 1 or the like) may obtain feedback regarding the set of top-scoring conversations. The computing system may provide and/or use the feedback for finetuning feature similarity weighting used in scoring conversations and/or linking conversations to events in the story. For example, in some embodiments, the computing system may provide data associated with the top scoring conversation to a user (e.g., service engineer, technician, customer, etc.) and obtain feedback for each conversation. The computing system may use the obtained feedback to finetune feature weights used in event-to-conversation linking—for example, using machine learning, as will be discussed below.

Processing proceeds to operation S270, where the computing system (e.g., server computer 200 of FIG. 1 or the like) can provide the service failure story to a collaboration platform for use in addressing the one or more service events. As an example, an output module 345 and/or the like can provide the service failure story for use in determining insights for addressing the service events (e.g., service failure, etc.).

Optionally, in some embodiments, processing may continue to operation S272, where the computing system (e.g., server computer 200 of FIG. 1 or the like) may generate a service failure story summary and provide the service failure story summary for use in addressing the one or more service events. For example, in some embodiments, the computing system may identify overlapping data between similar conversations and the story (e.g., service failure story, etc.). The computing system may generate a story summary based, at least in part, on the overlapping data. The computing system may provide the story summary for use in addressing the service events. In some embodiments, a story summary may include representative event, issue description data, entities included in the story, symptoms data, regions data, resolution data, and/or the like.

Further Comments and/or Embodiments

Figure 4:
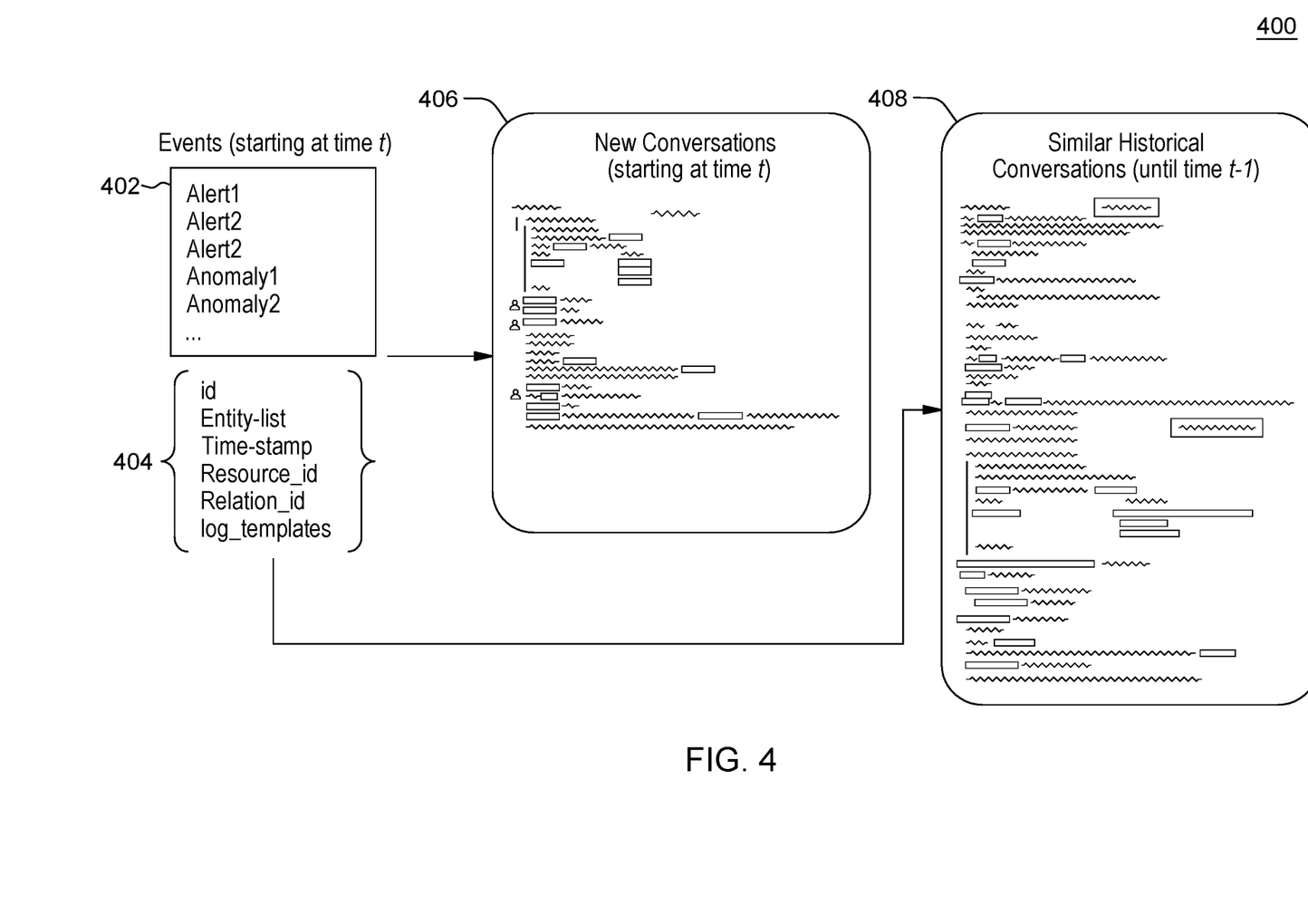
FIG. 4 depicts an example of events and associated new and similar conversations, according to embodiments of the present invention.

FIG. 4 depicts an example identification 400 of events and associated conversations, according to embodiments of the present invention. As illustrated in FIG. 4, in some embodiments, the occurrence of one or more events (e.g., service events, etc.), such as events group 402, can trigger the creation (and/or updating) of a service failure story as discussed herein. The events may include alerts, anomalies, and/or the like associated with a service failure. One or more new conversations 406 can be started in response to event(s) included in the events group 402. The events in events group 402 and the new conversations 406 are included in the service failure story.

A representative event may be determined for the events group 402 and a set of features 404 can be extracted for the representative event. Similar historical conversations 408 may be determined based on the features 404, the new conversations 406 in the story, and/or the like. One or more of the similar historical conversations can be included in the story and linked to event(s) in the story, for example based on feature similarity and/or the like.

Figure 5:
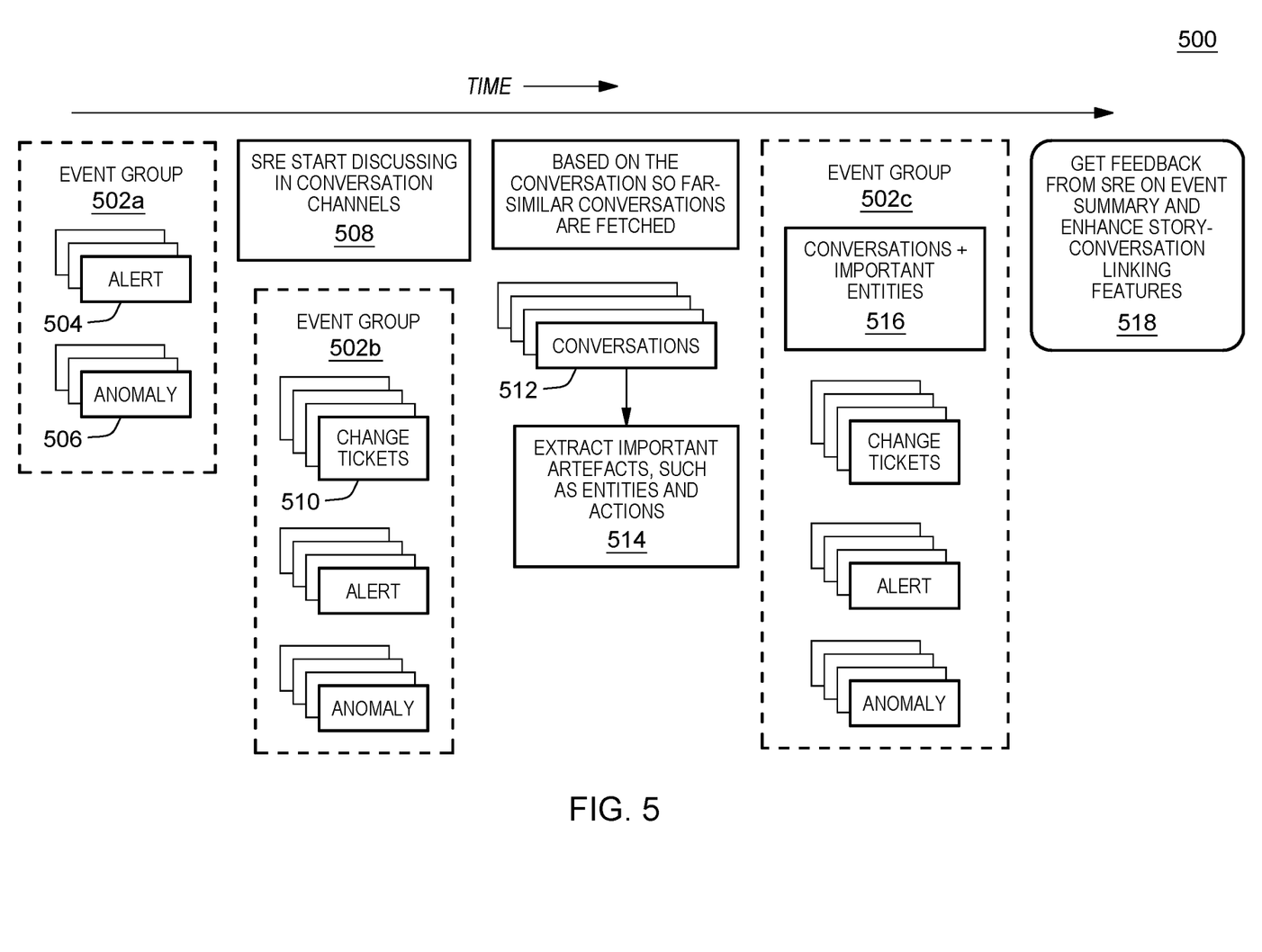
FIG. 5 depicts a block diagram of an example workflow to provide for generating stories to provide insights for grouped events, according to embodiments of the present invention.

FIG. 5 depicts a block diagram of an example workflow timeline 500 for generating event stories and providing insights for grouped events, according to embodiments of the present invention. According to aspects of the present disclosure, occurrence of one or more service events (e.g., alerts, anomalies, etc.) may trigger insight discovery including the creation of a story (e.g., service failure story, etc.) tracking events, linked conversations, and/or the like. As illustrated in FIG. 5, one or more alerts 504 and one or more anomalies 506 may be representative of a triggering event (e.g., service failure alert, anomaly, etc.) and/or may be related to/associated with (e.g., follow in time, etc.) a triggering event. As time progresses following a trigger event (e.g., follow-on events occur/appear, etc.), related/associated alerts 504 and/or anomalies 506 can be grouped together in an event group or story, such as in event group/story 502a. In response to the event(s), one or more new conversations 508 may begin (e.g., among collaborating site reliability engineer(s) (SRE), agents, technicians, teams, customers, stakeholders, etc.), for example, in association with a collaborative platform, channel(s), tools, and/or the like. In some embodiments, recent change ticket(s) 510 identified as related to the event(s) (e.g., based on topological entities, temporal vicinity, etc.) may be extracted (e.g., from a change ticket store, etc.). The extracted recent change tickets 510 (e.g., representative of related changes, etc.) may be included in the generated event group or story, such as shown in event group/story 502b.

Similar conversations 512 (e.g., similar historical conversations, etc.) can be identified based on the new conversations (e.g., related to the service event(s), etc.) included in a relevant event group/story, for example, from a historical conversation store, database, and/or the like. In some embodiments, important information (e.g., features, arte-facts, etc.) may be extracted from the similar conversations 512, such as extracted artefacts/features 514. For example, in some embodiments, extracted features/artefacts (e.g., key information of interest, etc.) may include features/artefacts such as impact, region, symptom, investigation, start time, action failed, resolution, change ticket(s) which induced event/issue, issue description, entities, and/or the like. One or more conversations (e.g., new conversations, most similar historical conversations, etc.) and/or important information (e.g., important entities, etc.) associated with (e.g., extracted from) the conversations, such as conversations/important entities 516, can be included in the story, such as in event group/story 502c.

In some embodiments, new conversations and/or similar historical conversations may be scored and/or ranked, for example, using weighted similarity scoring and/or the like. A set of high ranked conversations (e.g., top k similar historical conversations, etc.) can be included in the event group/story, such as in event group/story 502c. In some embodiments, the conversations can be linked to event(s) in the story.

The event group/story (e.g., event group/story 502c, etc.) can be provided to users (e.g., engineers, technicians, teams, customers, stakeholders, etc.) to assist in addressing (e.g., resolving) issues/failures. As an example, the event group/story (e.g., event group/story 502c, etc.) can be analyzed to discover and/or provide insights relevant to addressing (e.g., resolving, etc.) issues and/or service failures and restoring a service to normal execution as quickly as possible, with reduced impact on client business, and/or the like. In some embodiments, a story summary can be generated based on the event/group/story (e.g., event group/story 502c, etc.). As an example, a story summary may include issue description, entities in the story, symptoms, regions, resolution, and/or the like.

In some embodiments, feedback 518 related to the story summary, highest similarity conversations, event-conversation linking, and/or the like may be obtained (e.g., from site reliability engineers, other stakeholders, etc.). The feedback 518 may be used in finetuning feature similarity scoring, event-conversation linking, and/or the like.

In some embodiments, the feature similarity scoring and/or event-conversation linking is performed using a trained machine learning model, and the feedback 518 is provided as training data for supervised machine learning. For example, in an embodiment, a group of SREs is provided with a list of conversations (new and/or historical) and provides, as feedback 518, a ranking of the conversations. The feedback 518 is then used to train a machine learning model (e.g., an artificial neural network) using, for example, a learning to rank method, resulting in a trained model configured to rank conversations according to their relevance to the features of an event. Other machine learning model configurations and/or methodologies may also be utilized, as are known (or yet to be known) in the art. For example, in some embodiments, a machine learning model is trained to compute feature weights for computing a similarity score, as discussed above, using a learning to rank method or another method known (or yet to be known) in the art.

Figure 6:
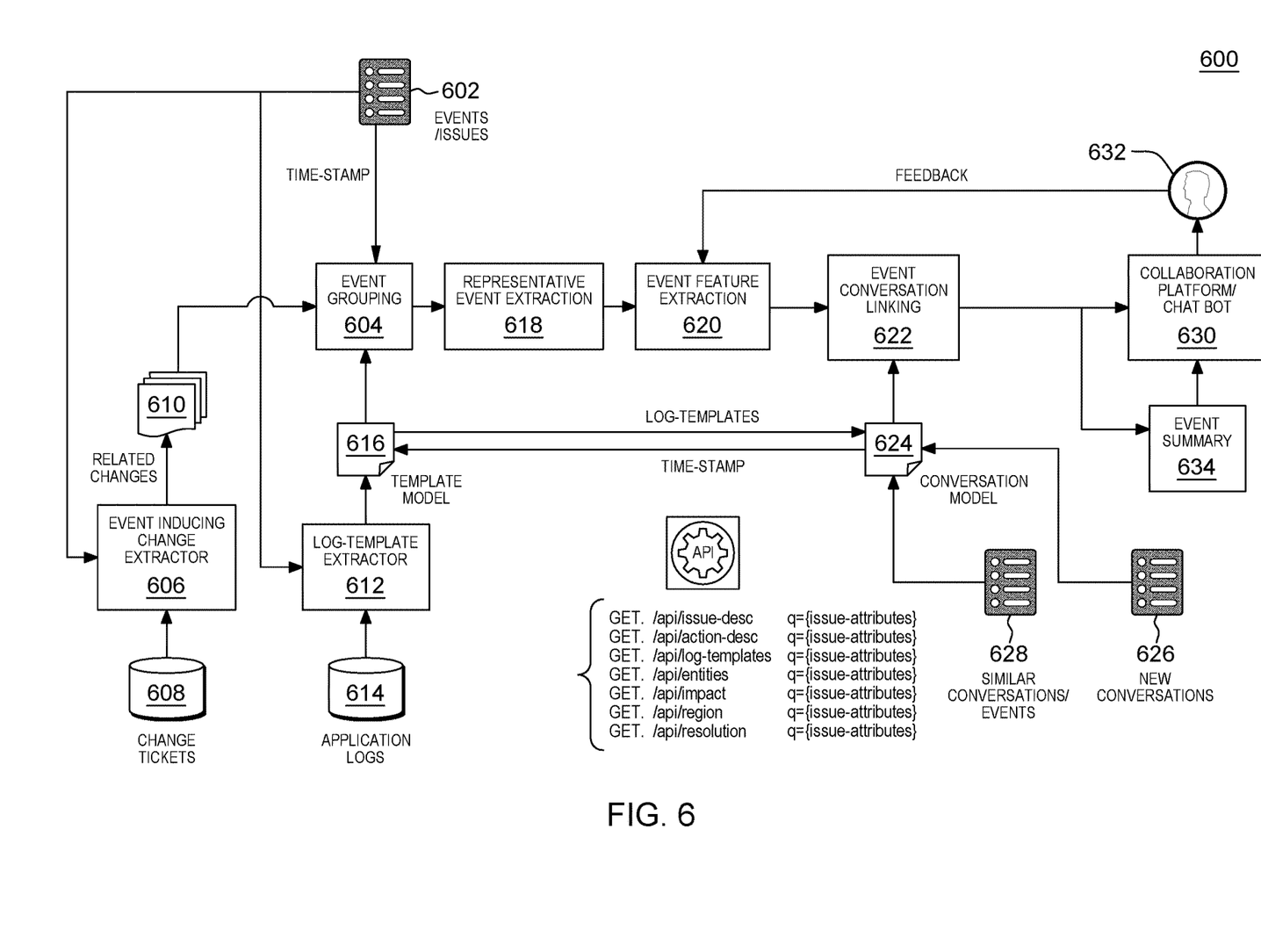
FIG. 6 depicts a block diagram of an example system architecture for discovering insights from events and associated conversations, according to embodiments of the present invention.

FIG. 6 depicts a block diagram of an example system architecture 600 for discovering insights from events and associated conversations, according to embodiments of the present invention. As illustrated in FIG. 6, in some embodiments, system architecture 600 may include event grouping 604, event-inducing change extractor 606, log-template extractor 612, representative event extractor 618, event feature extraction 620, event-conversation linking 622, story summary generator 634, a feedback 632, and/or the like. In some embodiments, system architecture 600 may include, be associated with, and/or access a change ticket store/database 608, an application log store/database 614, a historical conversation store/database (not shown), a collaboration platform 630, one or more collaborative conversation channels (not shown), and/or the like.

As illustrated in FIG. 6, one or more events/issues 602 may occur and be obtained by the system architecture 600, such as being provided to event grouping 604. In some embodiments, events/issues 602 can be provided to event-inducing change extractor 606. Event-inducing change extractor 606 can extract related recent change tickets (e.g., based on topological entities, temporal vicinity, etc.) from change ticket store/database 608. The event-inducing change extractor 606 can provide related recent change data 610 to event grouping 604.

As an example, in some embodiments, event-inducing change extractor 606 can extract image names from change tickets. Event-inducing change extractor 606 can identify topology objects/components (e.g., containers, nodes, pods, deployments, deployment configuration, etc.) which are associated with the images touched by the change. Event-inducing change extractor 606 can provide the related changes (e.g., related change data 610, etc.) to an event group (e.g., included in a story, etc.) based on topology objects/components common to the event, related topology objects/components, and/or the like. Event-inducing change extractor 606 may sort the related changes, for example, based on a relevance factor. For example, relevance sorting may be based on a relation between the change and an event topology object/object (e.g., some objects/components such as a same container may be more relevant than some other object/component such as a same node). Relevance sorting may be based on how recently a change was made on the same topology object component of an event and/or a related topology object/component. Relevance sorting may be based on a time difference between a change and an event occurrence (e.g., how recent was the change, etc.).

In some embodiments, events/issues 602 can be provided to log-template extractor 612. Log-template extractor 612 can extract logs from, for example, a log store/database 614. Log-template extractor 612 can convert extracted log data to log-templates, such as log-template model 616 and provide log-templates to event grouping 604. As an example, in some embodiments, log templates for an event can be obtained using a query of application log(s) based on a start-time (e.g., start-time feature, etc.) to retrieve logs between a start-time and an interval preceding the start-time (e.g., start-time minus ten (10), etc.) and preforming log mining to convert the logs to log templates for events.

Event grouping 604 can group events 602 (e.g., triggering event(s), future related events, etc.) and create a story (e.g., service failure story, etc.) that can include and track the grouped events and associated data, for example, to assist in insight discovery for addressing events/issues. As an example, an event group can include a list of events that arrive in succession. In some embodiments, event grouping 604 can incrementally group arriving events using one or more features. For example, events may be grouped based on features including entities, time, relation identifier, resource identifier, log-templates, and/or the like.

A representative event extractor 618 can identify a representative event for an event group that can be used to represent (e.g., is representative of) the whole event group. In some embodiments, representative event extractor 618 can compare features between each event in the group with all other events in the event group. Representative event extractor 618 can represent the event similarities as a priority queue (e.g., sim, event_i, event_j, etc.) and/or the like. Representative event extractor 618 can calculate a weighted sum of similarities for each event in the event group. Representative event extractor 618 can determine the event having a highest score as the representative event.

Event feature extraction 620 can extract defined features for the representative event. For example, in some embodiments, event feature extraction 620 can extract features including log-templates, entities, relation identifier, resource identifier, related change(s), and/or the like.

Event-conversation linking 622 can link events with conversations (e.g., new conversations, similar historical conversations, etc.) in the story. For example, in some embodiments, new conversations 626 and similar historical conversations 628 can be obtained by a conversation model 624 to provide conversation data (e.g., features, etc.) to be used by event-conversation linking 622 to link conversations and events for a story. In some embodiments, conversation model 624 can provide a start time (e.g., based on a timestamp, etc.) to template model 616 to obtain log-templates associated with a conversation.

In some embodiments, event-conversation linking 622 may extract features (key information of interest, etc.) from conversations. In some embodiments, event-conversation linking 622 may score new and similar historical conversations by determining an overlap between key features of an event and a conversation. As an example, in some embodiments, event-conversation linking 622 may calculate weighted similarity scores for conversations, for example, based on conversation features and event features.

In an example, in some embodiments, event-conversation linking 622 may extract features from each conversation including impact, region, symptom, investigation, start time, action failed, resolution, change ticket(s) which induced event/issue, issue description, entities, and/or the like. In some embodiments, a start time can be used to extract log-templates for a conversation. In some cases, a start time may not be present in a historical conversation. In such cases, an associated incident can be referred to and used to retrieve the above features. A similarity may be computed between a conversation and an event based on features including region, log templates, entities, change tickets, and/or the like. For example, a weight similarity score may be computed using the following similarity algorithm:

$$\text{Score} = k1 \cdot \text{region\_similarity\_score} + k2 \cdot \text{log\_template\_similarity\_score} + k3 \cdot \text{entity\_similarity\_score} + k4 \cdot \text{change\_similarity\_score},$$

where $k1+k2+k3+k4=1$ and the values of k1, k2, k3, and k4 may be finetuned based on feedback (e.g., user feedback, etc.). The top scoring conversations (e.g., top k similar conversations, etc.) may be provided for event-conversation linking.

In some cases, if only a description is used to compute a similarity score, the computed similarity score may be very low and provide a lot of false positives. This may be result, for example, because a word distribution of events and incidents may be in a different space. Additionally, a description of an event may be misleading. For example, two events may have similar textual descriptions, but they may have different symptoms and hence different resolutions. As such, in some embodiments, incident description may not be used for calculating a similarity score. In some embodiments, if only entities contained in the logs identified for an event are used to form a feature space, an improvement in accuracy may be obtained. In addition, using a log template feature can also provide an improvement in accuracy. For example, in many cases, two events that have the same symptoms also have similar log templates. In some embodiments, logs are extracted for a ten-minute interval before an event start time and log mining is used to generate the log templates. In some embodiments, using both events and log templates for computing similarity can provide very good accuracy.

A story (e.g., tracked events, linked conversations, etc.) can be provided to a collaboration platform 630 to discover insights and assist in addressing (e.g., resolving) service issues/events.

In some embodiments, feedback 632 related to the story may be obtained, such as feedback related to highest similarity conversations, event-conversation linking, and/or the like. The feedback 632 may be provided to event feature extraction 620 for use in finetuning feature similarity scoring, event-conversation linking, and/or the like.

A story summary generator 634 may generate and provide a story summary based on data included in a story, for example based on overlapping information between similar conversations and the events in the story and/or the like. As an example, in some embodiments, a story summary may include issue description, entities in the story, symptoms, regions, resolution, and/or the like.

Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
in an information technology (IT) management system, grouping one or more ongoing service failure events into a service failure record;
identifying a representative event for the service failure record from the one or more ongoing service failure events grouped in the service failure record;
extracting features associated with the representative event;
identifying one or more conversations, stored in the IT management system, that relate to the one or more ongoing service events;
computing, using a similarity algorithm, feature similarity scores for respective conversations of the one or more conversations based, at least in part, on the extracted features associated with the representative event and features associated with the respective conversations;
linking a subset of the one or more conversations to the one or more ongoing service events in the service failure record based, at least in part, on the computed feature similarity scores; and
providing the service failure record to a collaboration platform utilized in addressing the one or more ongoing service events.

2. The computer-implemented method of claim 1, further comprising:
obtaining feedback on the service failure record from one or more users of the collaboration platform; and
training one or more components of the similarity algorithm based, at least in part, on the obtained feedback.

3. The computer-implemented method of claim 2, wherein training one or more components of the similarity algorithm based, at least in part, on the obtained feedback comprises training a machine learning algorithm to generate feature weights utilized in the similarity algorithm.

4. The computer-implemented method of claim 3, wherein the training of the machine learning algorithm utilizes a learning to rank method.

5. The computer-implemented method of claim 3, wherein the feature weights include: (i) a first feature weight corresponding to a region feature of the representative event, (ii) a second feature weight corresponding to a log template feature of the representative event, (iii) a third feature weight corresponding to an entity feature of the representative event, and (iv) a fourth feature weight corresponding to a change ticket feature of the representative event.

6. The computer-implemented method of claim 1, wherein identifying one or more conversations, stored in the IT management system, that relate to the one or more ongoing service events comprises:
identifying one or more new conversations, stored in the IT management system, that are responsive to the one or more ongoing service events; and identifying one or more historical conversations, stored in the IT management system, based, at least in part, on the one or more new conversations.

7. The computer-implemented method of claim 1, further comprising:
identifying, in the IT management system, one or more change tickets associated with the one or more ongoing service events based, at least in part, on system topology objects associated with the ongoing service events; and
linking the one or more change tickets to the one or more ongoing service events in the service failure record.

8. A computer program product comprising a computer readable storage medium having stored thereon:
program instructions to, in an information technology (IT) management system, group one or more ongoing service failure events into a service failure record;
program instructions to identify a representative event for the service failure record from the one or more ongoing service failure events grouped in the service failure record;
program instructions to extract features associated with the representative event;
program instructions to identify one or more conversations, stored in the IT management system, that relate to the one or more ongoing service events;
program instructions to compute, using a similarity algorithm, feature similarity scores for respective conversations of the one or more conversations based, at least in part, on the extracted features associated with the representative event and features associated with the respective conversations;
program instructions to link a subset of the one or more conversations to the one or more ongoing service events in the service failure record based, at least in part, on the computed feature similarity scores; and
program instructions to provide the service failure record to a collaboration platform utilized in addressing the one or more ongoing service events.

9. The computer program product of claim 8, the computer readable storage medium having further stored thereon:
program instructions to obtain feedback on the service failure record from one or more users of the collaboration platform; and
program instructions to train one or more components of the similarity algorithm based, at least in part, on the obtained feedback.

10. The computer program product of claim 9, wherein the program instructions to train one or more components of the similarity algorithm based, at least in part, on the obtained feedback comprise program instructions to train a machine learning algorithm to generate feature weights utilized in the similarity algorithm.

11. The computer program product of claim 10, wherein the training of the machine learning algorithm utilizes a learning to rank method.

12. The computer program product of claim 10, wherein the feature weights include: (i) a first feature weight corresponding to a region feature of the representative event, (ii) a second feature weight corresponding to a log template feature of the representative event, (iii) a third feature weight corresponding to an entity feature of the representative event, and (iv) a fourth feature weight corresponding to a change ticket feature of the representative event.

13. The computer program product of claim 8, wherein the program instructions to identify one or more conversations, stored in the IT management system, that relate to the one or more ongoing service events comprise:
program instructions to identify one or more new conversations, stored in the IT management system, that are responsive to the one or more ongoing service events; and
program instructions to identify one or more historical conversations, stored in the IT management system, based, at least in part, on the one or more new conversations.

14. The computer program product of claim 8, the computer readable storage medium having further stored thereon:
program instructions to identify, in the IT management system, one or more change tickets associated with the one or more ongoing service events based, at least in part, on system topology objects associated with the ongoing service events; and
program instructions to link the one or more change tickets to the one or more ongoing service events in the service failure record.

15. A computer system comprising:
a processor set; and
a computer readable storage medium;
wherein:
the processor set is structured, located, connected and programmed to run program instructions stored on the computer readable storage medium; and
the stored program instructions include:
program instructions to, in an information technology (IT) management system, group one or more ongoing service failure events into a service failure record;
program instructions to identify a representative event for the service failure record from the one or more ongoing service failure events grouped in the service failure record;
program instructions to extract features associated with the representative event;
program instructions to identify one or more conversations, stored in the IT management system, that relate to the one or more ongoing service events;
program instructions to compute, using a similarity algorithm, feature similarity scores for respective conversations of the one or more conversations based, at least in part, on the extracted features associated with the representative event and features associated with the respective conversations;
program instructions to link a subset of the one or more conversations to the one or more ongoing service events in the service failure record based, at least in part, on the computed feature similarity scores; and
program instructions to provide the service failure record to a collaboration platform utilized in addressing the one or more ongoing service events.

16. The computer system of claim 15, the stored program instructions further comprising:
program instructions to obtain feedback on the service failure record from one or more users of the collaboration platform; and
program instructions to train one or more components of the similarity algorithm based, at least in part, on the obtained feedback.

17. The computer system of claim 16, wherein the program instructions to train one or more components of the similarity algorithm based, at least in part, on the obtained feedback comprise program instructions to train a machine learning algorithm to generate feature weights utilized in the similarity algorithm.

18. The computer system of claim 17, wherein the training of the machine learning algorithm utilizes a learning to rank method.

19. The computer system of claim 17, wherein the feature weights include: (i) a first feature weight corresponding to a region feature of the representative event, (ii) a second feature weight corresponding to a log template feature of the representative event, (iii) a third feature weight corresponding to an entity feature of the representative event, and (iv) a fourth feature weight corresponding to a change ticket feature of the representative event.

20. The computer system of claim 15, wherein the program instructions to identify one or more conversations, stored in the IT management system, that relate to the one or more ongoing service events comprise:
 program instructions to identify one or more new conversations, stored in the IT management system, that are responsive to the one or more ongoing service events; and
 program instructions to identify one or more historical conversations, stored in the IT management system, based, at least in part, on the one or more new conversations.

* * * * *